United States Patent [19]
Hoffman

[11] Patent Number: 5,384,838
[45] Date of Patent: Jan. 24, 1995

[54] SYSTEM FOR COMMUNICATING THROUGH PARTITIONS

[76] Inventor: Ronald J. Hoffman, 33165 Cannon Rd., Solon, Ohio 44139

[21] Appl. No.: 885,175

[22] Filed: May 19, 1992

[51] Int. Cl.⁶ .................. H04M 1/00; H04M 1/60
[52] U.S. Cl. ............................. 379/167; 379/164; 379/165; 379/168
[58] Field of Search .......... 379/103, 167, 170, 161, 379/164, 165, 168, 169

[56] References Cited

U.S. PATENT DOCUMENTS

| | | | |
|---|---|---|---|
| 3,215,781 | 7/1962 | Yong | 379/169 |
| 4,123,620 | 10/1978 | Karlsson | 379/167 |
| 4,130,728 | 12/1978 | Grauel | 379/167 |
| 4,554,411 | 11/1985 | Armstrong | 379/103 |
| 4,584,436 | 4/1986 | Boenning et al. | 379/167 |
| 4,631,365 | 12/1986 | Potter et al. | 379/167 |
| 4,636,585 | 1/1987 | Brandstatter | 379/167 |
| 4,658,095 | 4/1987 | Santiago | 379/103 |
| 4,764,953 | 8/1988 | Chern et al. | 379/103 |
| 4,894,858 | 1/1990 | Collingwood | 379/167 |
| 5,138,656 | 8/1992 | Shanes | 379/167 |
| 5,148,468 | 9/1992 | Marrick et al. | 379/167 |
| 5,228,078 | 7/1993 | Bitzmann | 379/169 |

Primary Examiner—James L. Dwyer
Assistant Examiner—Vijay Shankar
Attorney, Agent, or Firm—D. Peter Hochberg; Mark Kusner; Michael Jaffe

[57] ABSTRACT

An intercommunication system for transmitting signals through a door, and having piezo transducer devices mountable on each side of the door, a matrix of analog switches connecting the piezo transducer devices to the input and output of a bridge amplifier, and a TALK switching device which controls which piezo transducer device is connected to the bridge amplifier through the analog switches as a speaker or as a microphone.

13 Claims, 5 Drawing Sheets

SYSTEM FOR COMMUNICATING THROUGH PARTITIONS

FIELD OF THE INVENTION

This invention relates to intercommunication ("intercom") devices, and in particular to intercommunication devices for transmitting voices and other aural signals through doors and other partitions to provide privacy, anonymity, and security.

DESCRIPTION OF THE PRIOR ART

Intercom systems have been around for many years to enable people to converse with one another when they are in different locations, or separated by sound barriers such as walls, windows, or doors. These systems are well known in the art. Some of these systems piggyback a high frequency signal on the A.C. power lines to communicate between the inside and outside station. Other systems use radio frequency (R.F.) transmission to communicate between stations much the same as walkie-talkies. These types of intercom systems require a substantial power source to operate the unit. These systems need high operating currents to power the amplifier and speakers in the intercom, to power the R.F. circuitry, and to power the modulation and decoding circuitry. This requires A.C. power wiring, or 24 VAC door-bell wiring, custom in-wall mounting of the unit, through holes drilled for wiring, and large, outdoor, weather-proof speaker housings. The units therefore tend to be expensive, require additional expensive installation, require safety agency approvals for materials and construction, and are expensive to repair.

SUMMARY OF THE INVENTION

It is an object of the present invention to provide an improved intercom device for transmitting voices and/or other aural signals through doors and other partitions.

Another aspect is to provide an intercom device as described above which enables such transmission in privacy, anonymity and security.

Yet another object of the invention is to provide an intercom system which requires low current consumption while yielding satisfactory volume outputs.

Another object is to provide an intercom system which can be installed on a door easily with no tools.

It is a further object to provide an intercom system which has satisfactory volume of sound output without feedback.

It is still another object to provide an effective intercom system for a door which is inexpensive to make.

An object of the invention is to provide an intercom system which provides clear and understandable outputs.

Another object is to provide a battery powered intercom device which can be operated with a battery which causes little current drain on the battery and provides long battery life.

Other objects will be understood from the description to follow and from the appended claims.

The present invention in a preferred form, is a very low cost intercom system designed to attach easily to a door and provide two-way communication through the door without having to open the door. Security, anonymity, privacy and safety can be maintained via the locked door. To provide long battery life, low current consumption, ample volume levels, simple no-tool installation and mounting, and low manufactured cost, several unique circuit methods, construction methods and material combinations are employed to achieve the desired performance parameters.

The preferred form of the invention is a battery powered (although other forms of electrical power can be used), completely self-contained, intercom system which can be attached to any door without tools. It uses readily available alkaline batteries to provide the system voltage to power the unit for long periods of service. It preferably features one button operation, automatic shut-off, a pre-determined time after the last button actuation, ultra-low-current standby mode, electronic door bell signal, OFF push-button switch to conserve batteries and eliminate feedback oscillations when the door is opened, peel-and-stick foam mounting pads for simple attachment to any door and to eliminate sound transmission through the door, integral speaker diaphragm and protective decorator label, built in battery compartment and volume control for maximum sound adjustment without feedback.

When a visitor comes to the door, the visitor can press a push-button and the system will make an electronic tone to call the owner to the door (like a doorbell). This also activates the amplifier circuit so the person inside can listen to the caller outside. When the owner wishes to speak to the person outside, he presses and holds a push-button to place the system in a TALK mode and speaks into the speaker. To listen, the owner releases the foregoing push-button. The unit turns OFF automatically a pre-determined time, such as 30 seconds, after the push-button for the TALK or DOORBELL mode is last pressed to conserve the batteries. A manual "OFF" push-button is provided on the inside unit to shut the system OFF immediately after use to further conserve batteries or before opening the door to eliminate feedback and oscillations. The intercom system inside unit has a volume control which allows the user to adjust the system for maximum volume without annoying feedback or "squeals".

To install the unit, the user peels off the backing material from the foam feet of the outside unit and attaches the unit to the outside of the door at about shoulder or mouth level and in from the edge of the door about two inches. Next, he/she peels the backing off of the foam feet of the inside unit, proceeds to pull the ribbon cable taut around the edge of the door and presses the inside unit against the inside door surface. On some doors, the ribbon cable will not be drawn tight due to the units needing to be mounted close to the edge of the door. The excess ribbon cable can be conveniently stored in a storage compartment in the inside unit. Two nine volt batteries are required to operate the unit; they can be stored in a compartment in the inside unit after they are snapped onto the battery connectors.

Two alkaline 9 volt batteries can power the unit for 1 to 2 years before needing replacement. The ultra-low-power amplifier circuits only use current when activated, and otherwise consume nano-amps of current in the standby mode. There are no moving parts or electro-mechanical devices of any kind in the unit to provide for reliability, easy assembly, and low cost.

DETAILED DESCRIPTION OF THE PREFERRED EMBODIMENT

Figure 1:
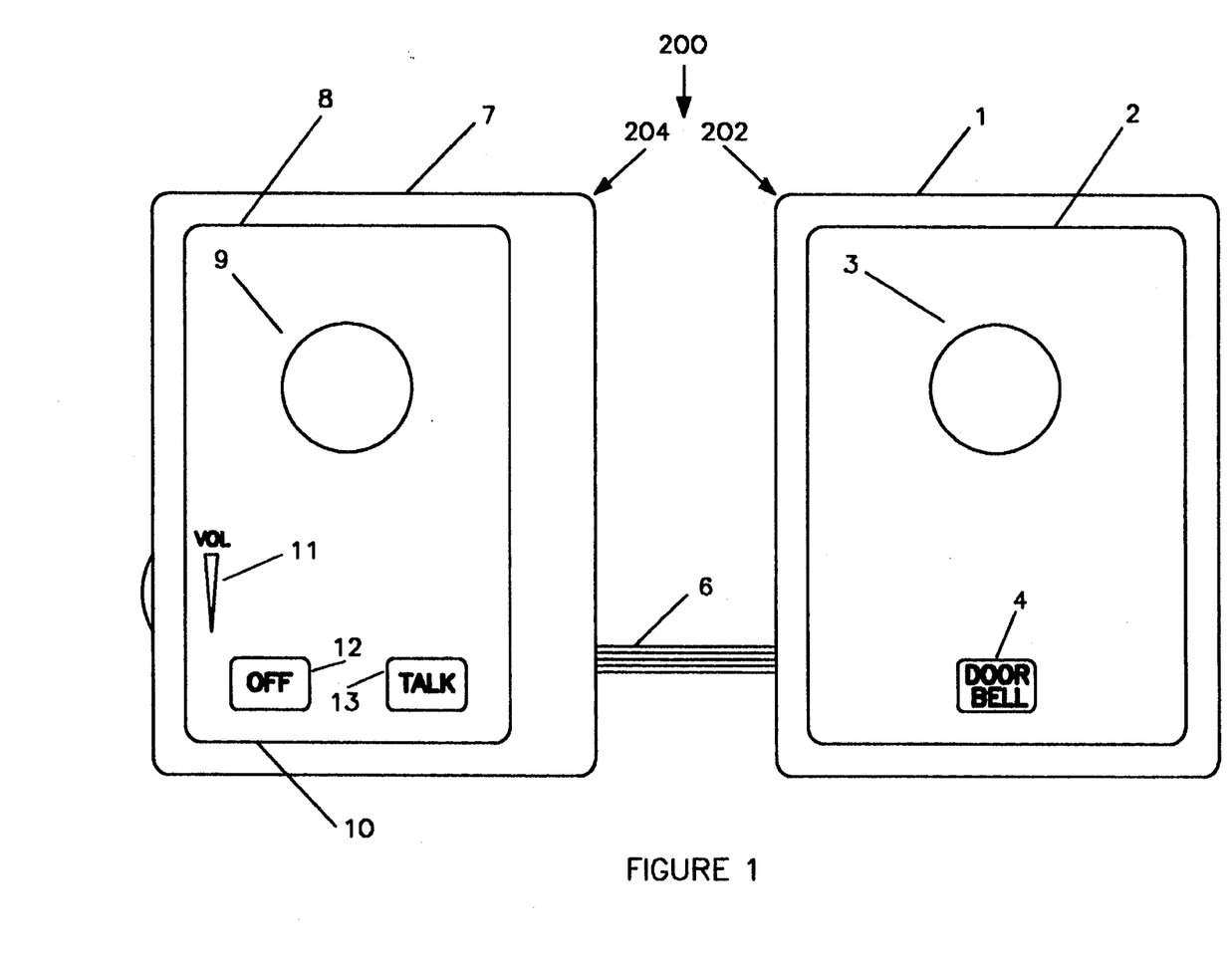
FIG. 1 is a front view of the preferred embodiment of the invention.
Figure 2:
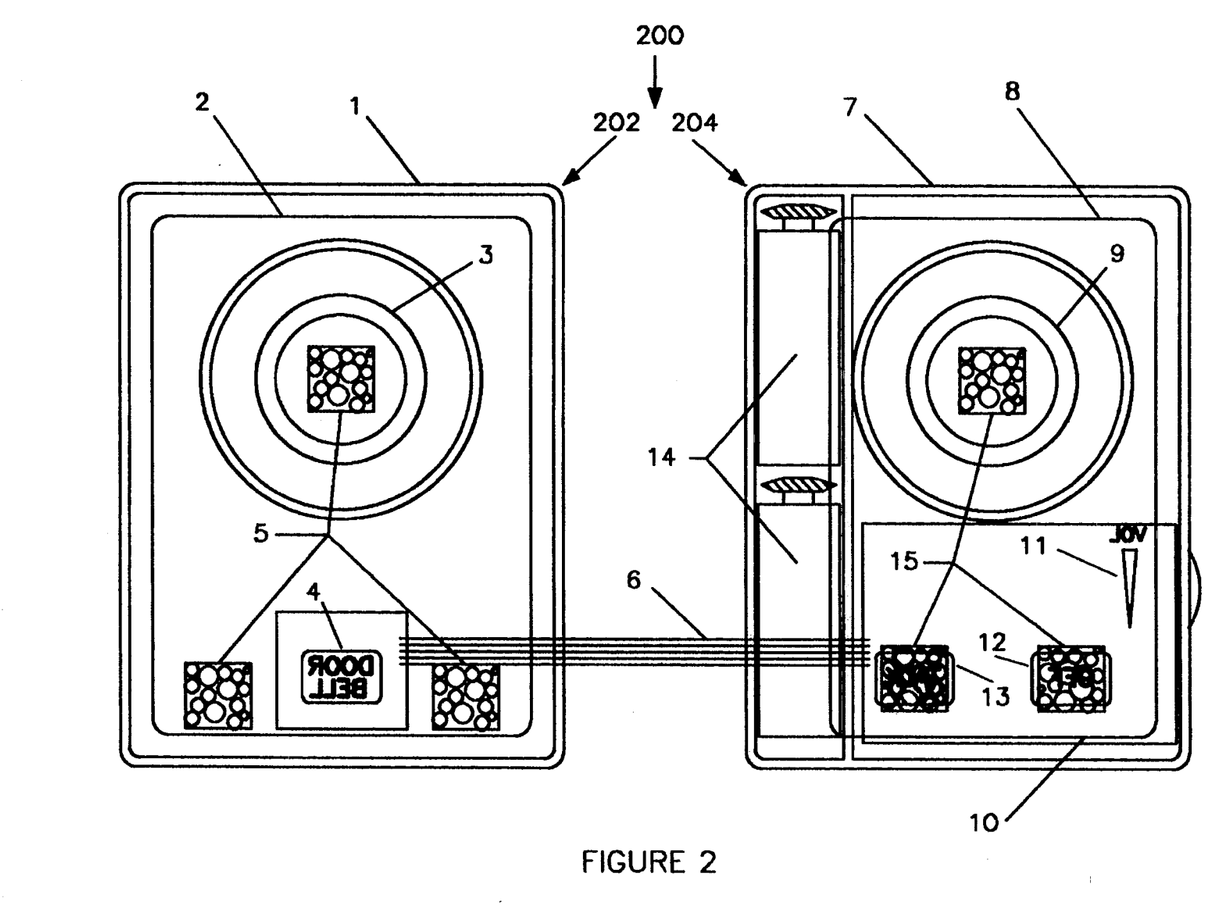
FIG. 2 is a rear view of the embodiment shown in FIG. 1.
Figure 3:
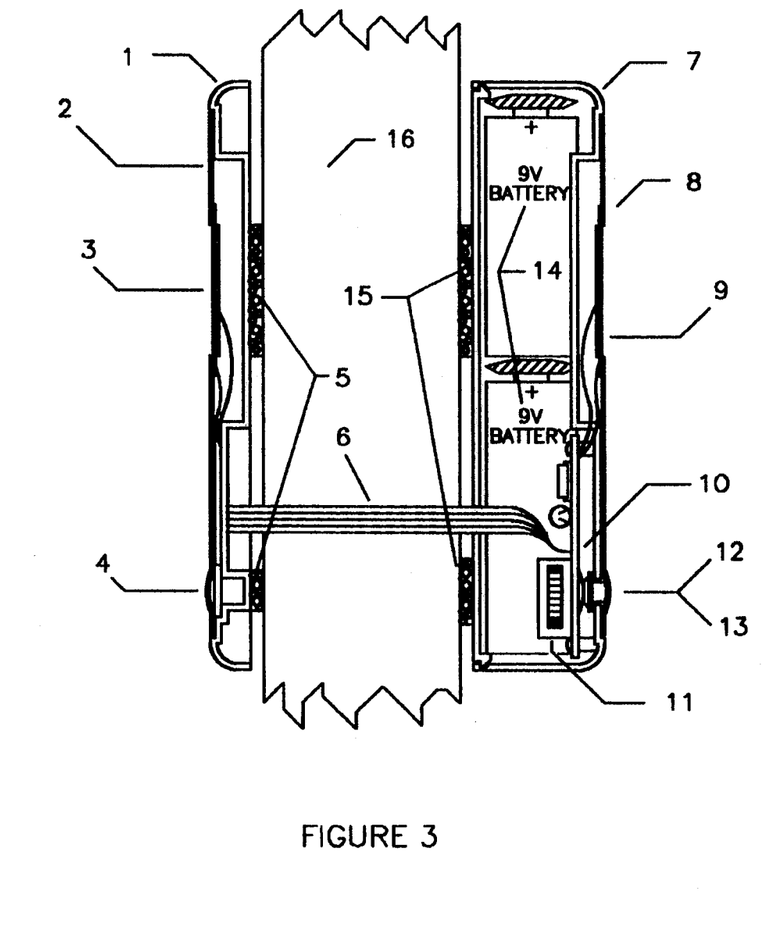
FIG. 3 is a cross-sectional view of the above embodiment which is mounted on a door.

Referring to FIGS. 1, 2 and 3, an intercom system 200 according to the preferred embodiment of the invention is shown. It has an outside unit 202 comprising a housing 1, a protective sheet shown here as a decorator label 2, a piezo transducer element 3, a "DOOR BELL" push-button switch 4, three foam mounting pads 5 and a 4-conductor ribbon cable 6.

System 200 further includes an inside unit 204, having a housing 7, a protective sheet also shown as a decorator label 8, a piezo transducer element 9, an electronic circuit board 10, a volume control knob 11, an "OFF" push-button switch 12, a "TALK" push-button switch 13, a pair of 9-volt alkaline batteries 14, and foam mounting pads 15.

It became apparent to the inventor that conventional speakers could not be used if the system was to use very little electric current while operating and near zero current in its stand-by mode, to enable the batteries to last for 1 to 2 years. Conventional speakers require low driving impedance and rather high current to produce sound. The high current to drive the speakers would quickly drain the batteries, would require a high current power switch to turn the system OFF when not in use, and would require a high current switch such as a conventional double-pole, double-throw switch to accomplish the press-to-talk function. Further, conventional speakers require impedance matching transformers to be used as microphones which add to cost, size, and weight. Moreover, conventional speakers are heavy and have low efficiencies in converting electrical signals to sound, thus requiring more powerful amplifiers that would quickly drain batteries and in turn, would require a line voltage power supply due to the amount of power needed.

To overcome these problems, piezo transducer elements 3 and 9 were selected for alternate use as the speaker and as the microphone. Piezo transducers are well known. They are highly efficient in converting electrical signals into sound and converting sound into electrical signals which can readily be amplified. They have a high impedance and require very low drive current. This allows them to be used with CMOS analog switches. In turn, a single pole momentary switch can control the push-to-talk function. The inventor did realize, however, that piezo transducers do present some problems. They require high voltages to generate adequate amounts of sound power output, and they must be mounted to enhance the piezo electric effect, lower the load impedance, and increase the sound output. The inventor found that by mounting the piezo transducer elements 3 and 9 to polypropylene labels 2 and 8 respectively, the labels each acted as a speaker diaphragm which increased the sound output dramatically and decreased the dynamic impedance of each piezo transducer element. Each piezo transducer element 3 and 9 is attached, respectively, to labels 2 and 8, and adhesive (of known type) placed on the back of the label, serves to hold the piezo transducer elements in place, as well as to affix the label to its respective housing 1 and 7. Further, the inventor found that if a hole was cut in the label 2 and 8, equal in diameter to the diameter of the piezo crystal elements, 3 and 9, the piezo transducer output was further increased to its relative maximum. This happens because the nodal vibration boundary occurs at the edge of the piezo ceramic wafer. Since the label stops at the boundary, the outer brass plate of the piezo transducer 3 and 9, and the label 2 and 8, form an extended resonating surface to enhance sound generation and output. The housings 1 and 7 form a larger mounting diameter for the diaphragm label similar in function to a speaker frame. It allows each piezo transducer element 3 and 9 and the respective labels 2 and 8, to spherically flex in and out to increase the movement of air and increase sound output. The labels, which are attached to the housings 1 and 7, also serve to seal the unit and push-button switches from dirt and moisture, while still allowing the operation of the switches.

Figure 4:
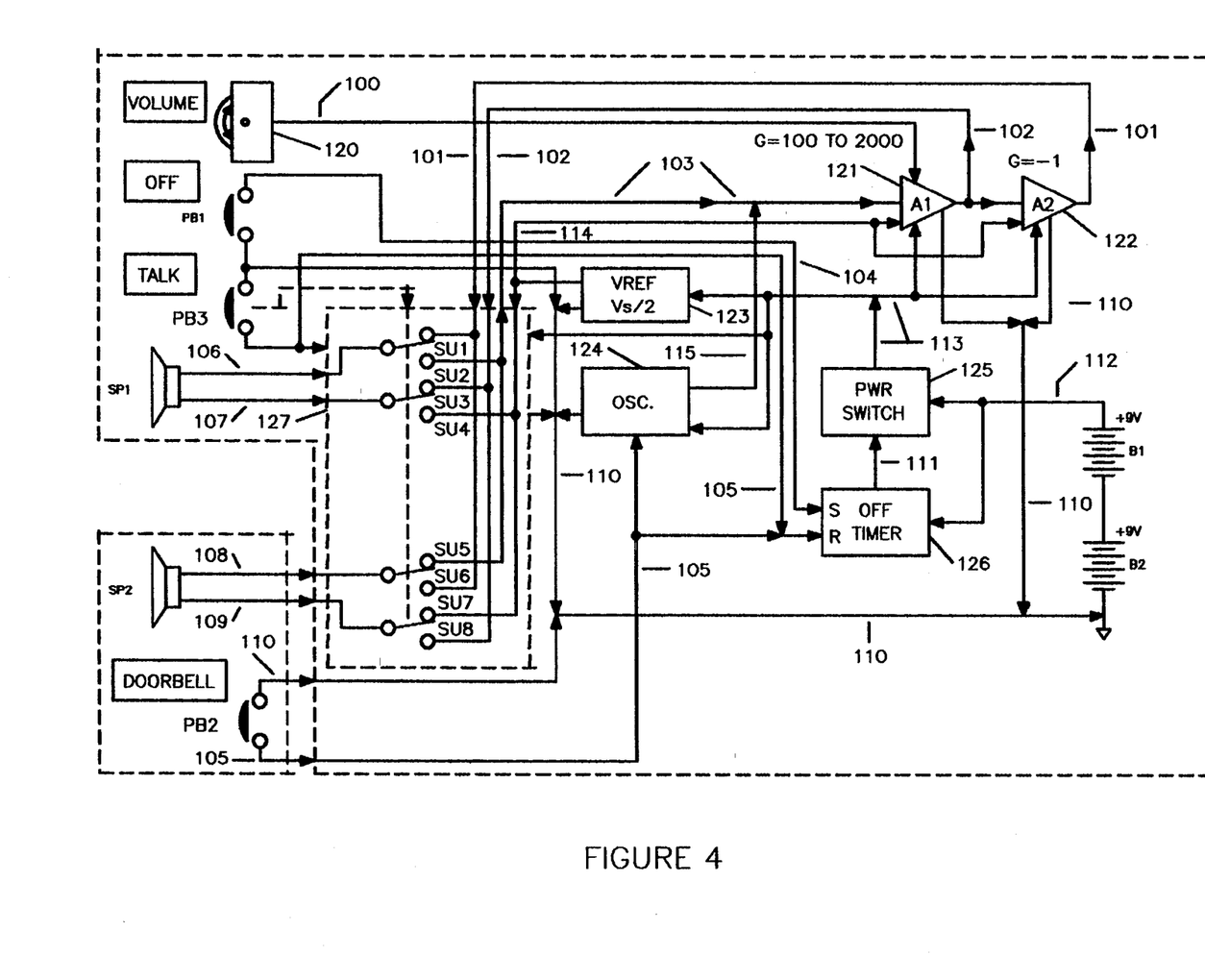
FIG. 4 is a block diagram of the electronic circuit incorporated in the foregoing embodiment.
Figure 5:
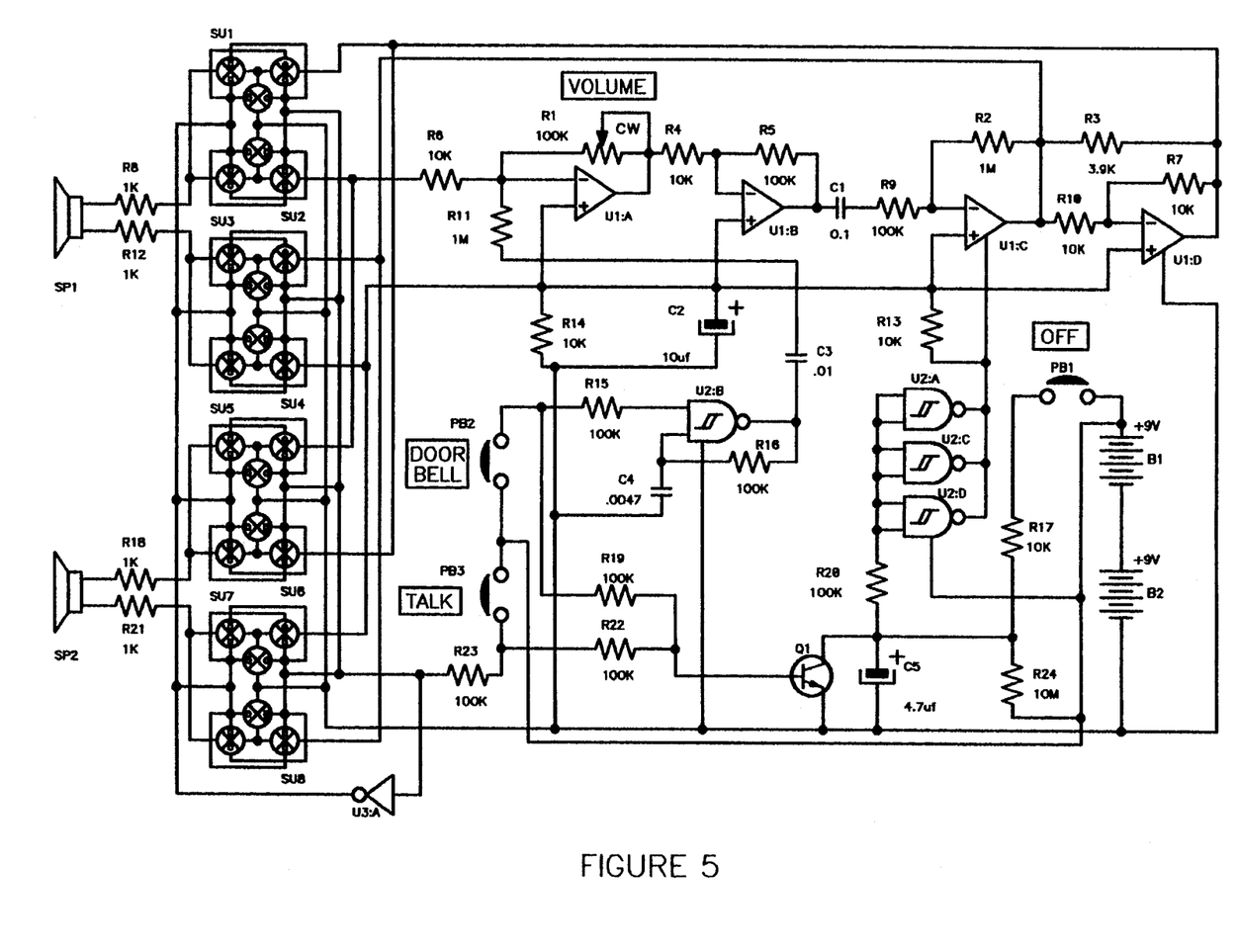
FIG. 5 is a detailed schematic of the foregoing electronic circuit.

To overcome the problem of high voltage generation to drive the piezo transducers 3 and 9, the inventor found that a simple and very efficient method was to use two standard 9 volt batteries 14, (FIGS. 4 and 5, items B1 and B2), and combine them with a bridge output amplifier, (FIG. 4, A1, 121 and A2, 122, FIG. 5, U1:c and U1:d). This provides a $\pm 18V$ or 36 volt peak-to-peak output signal to drive the piezo transducers. A piezo transducer appears effectively in the circuit as a capacitor. Since the energy stored in a capacitor is equal to $0.5 (C)(V^2)$, where C is the effective capacitance and V is the voltage, each doubling of the voltage results in a four times increase in the output power. The inventor developed a circuit (FIGS. 4 and 5) including a bridge output amplifier (A1, 121; A2, 122) and two 9 volt batteries (B1, B2) connected in series to obtain a loud enough output. The circuit includes electronic analog switches, SU1 through SU8, which are limited to around 20 volts before they breakdown, which was a limiting factor in the design using standard components. Obviously, higher outputs could be obtained by using higher supply voltages and switches with higher breakdown voltages.

Once adequate sound output was achieved, the inventor next overcame acoustic feedback through a door 16 on which the system is shown mounted. In operation, one of the piezo transducers (SP1, SP2) acts as a microphone and the other as a speaker. When sound from the speaker transducer is transmitted through the door 16 to the microphone and there is sufficient amplifier gain, an oscillatory feedback occurs. In order to eliminate the feedback, the inventor first reduced the amplifier gain via the volume control 11, 120 and R1, and therefore the output sound level. The inventor further reduced the sound transmission from the speaker SP1 or SP2 through the door 16, to the microphone, the other of the piezo transducers SP1 or SP2. The inventor accomplished this by designing the housing and the mounting feet 5 and 15, to absorb sound energy and reduce the through-the-door transmission of sound vibrations. To mount the units easily to the door, and to conform to a contoured door's surfaces, the inventor determined that a soft, dense, closed-cell, poly-vinyl foam material significantly reduced sound transmission through the door, eliminating feedback. The inventor found that the foam surface area had a direct effect on the amount of sound transmitted through the door 16. As the foam surface area decreased, the transmitted sound decreased. By placing foam pads at specific locations on the back of the unit housings, operational mechanical stability and minimal sound transmission was achieved. A triangular placement of foam pads on the back of the inside and outside housings 1 and 7, provided the optimal mechanical support with minimal acoustic transmission through the door 16. Since three points define a geometric plane in space, the units always fit to the door surface without undue compression forces that would increase sound transmission and decrease performance.

The greatest performance was achieved when the sound transmission through the door 16 was a minimum, and the volume control 11, 120, R1 was set to the maximum setting without causing audible feedback.

Referring next to FIGS. 4 and 5, the blocks in FIG. 4 are comprised of the components in FIG. 5 as follows:

AMPLIFIER A1—R2,R3,R4,R5,R6,R9,C1,U1:A,U1:B,U1:C;
AMPLIFIER A2—R7,R10,U1:D;
VREF Vs/2—R13,R14,C2;
OSC—R11,R15,R16,C3,C4,U2:B;
PWR SWITCH —R20,U2:A,U2:C,U2:D;
OFF TIMER—R17,R19,R22,R24,C5,Q1;
ANALOG SWITCHES—R8,R12,R18,R21,R23,SU1 THRU SU8,U3:A,
VOLUME—R1;
OFF—PB1;
TALK—PB3;
INSIDE SPEAKER—SP1;
DOOR BELL—PB2;
OUTSIDE SPEAKER—SP2;
BATTERIES—B1,B2.

The normal operation of the intercom 200 is as follows. Most of the timer the intercom system resides in a stand-by mode drawing an infinitesimal amount of current until either the "DOORBELL" PB2 or "TALK" PB3 push-buttons are pressed. When the "DOORBELL" PB2 button is pressed, the OFF timer 126 is reset via connection 105. This activates the power switch 125 via connection 111. Power from the batteries B1 and B2 is connected via connection 112 to the power switch 125, then via connection 113, to the bridge amplifier comprised of amplifier A1(121) and amplifier A2(122), to the voltage divider circuit Vs/2 REF(123), to the oscillator circuit OSC(124), and to the analog switches SU1 thru SU8 (127). Connection 105 enables the oscillator circuit OSC(124) to operate. A tone signal is sent from the oscillator circuit OSC(124) via connection 115 to the bridge amplifier circuit A1(121), A2(122). The output signal from the bridge amplifier circuit A1(121), A2(122) is sent to the inside speaker SP1 via connections 101 and 102, analog switches SU1 and SU3, and connections 106 and 107 respectively. Inside speaker SP1 produces an audible tone to signal that someone is at the door. The OFF TIMER 126 begins timing after the DOOR BELL PB2 button is released. After a specified period of timer the OFF TIMER 126 would be set turning off the PWR SWITCH 125 via connection 111. If either the DOOR BELL PB2 or TALK PB3 push-button is pressed during the OFF TIMER 126 timing period, the timer is reset, via connection 105, for the full time period. Thus, a normal conversation which requires the TALK PB3 button to be pressed periodically will cause the intercom to be powered continuously during the conversation. Once the conversation has concluded and neither the,DOOR BELL PB2 or TALK PB3 push-buttons are pressed, the OFF TIMER 126 times out and the intercom unit 200 is turned OFF to the stand-by (tiny current) mode. This saves the batteries and allows for a long operating life, essentially equal to the battery shelf life. An OFF push-button PB1 is also provided to manually set the OFF TIMER 126 via connection 104. The OFF push-button PB1 places the intercom in the standby (tiny current) mode to eliminate oscillatory feedback when the door is opened to admit a guest after confirming their identity, or to shut the unit OFF manually to conserve the batteries after a conversation.

Unless the person on the inside presses and holds the TALK push-button PB3, the intercom 200 remains in the LISTEN mode. This allows the person inside to monitor conversations and sounds outside the door without having to take any action except to momentarily press the TALK push-button PB3 to activate the intercom. The analog switches 127 are wired so they normally connect the outside speaker SP2 via connections 108, 109, and analog switches SU5, SU7, to the input of amplifier A1(121) via connection 103 and to the VREF Vs/2(123) via connection 114. As previously described, the output from bridge amplifier A1(121),A2(122) is connected to the inside speaker SP1 via connections 102,101, analog, switches SU1,SU3, and connections 107,106, respectively. The gain of amplifier A1(121) is controlled by volume control 120,R1. This is adjusted for the maximum volume just below the point of feed-back. When the TALK push-button PB3 is pressed and held in, connection 105 to the analog switches 127, causes switches SU1,SU3,SU5,SU7 to turn OFF and switches SU2,SU4,SU6,SU8 to turn ON. When this is the case, inside speaker SP1, is connected to the input of amplifier A1(121) via connections 106 and 107, analog switches 127, SU2, SU4 and connections 103, 114. The output from bridge amplifier A1(121), A2(122) is connected to the outside speaker SP2 via connections 102,101, analog switches 127, SU8, SU6, and connections 109,108 respectively. Connection 114 provides a reference voltage to amplifiers A1(121),A2(122) which is one-half of the supply voltage generated by batteries B1,B2. The output voltage of amplifier A2(122), is equal to minus one times the output voltage of amplifier A1(121). Thus, if the output voltage of amplifier A1(121) is −9 volts compared to VREF Vs/2(123), then the output voltage of amplifier A2(122) will be +9 volts compared to VREF Vs/2(123). Conversely, if the output voltage of amplifier A1(121) is +9 volts compared to VREF Vs/2(123), then the output voltage of amplifier A2(122) will be −9 volts compared to VREF Vs/2(123). In both cases the peak differential voltage delivered to the output speaker is 18 volts. Since the voltage can be swung both positive and negative by 18 volts, the total peak-to-peak voltage is 36 volts, which is twice as large as the battery supply voltage. This technique quadruples the power delivered to the transducer which can be modeled as a capacitor. Since the energy is stored as E=0.5 (C)(V 2), if V is doubled, E will be quadrupled. The bridge amplifier A1(121),A2(122) requires twice as many switch contacts as a standard single output amplifier, but since the current is low, analog switches 127, SU1 through SU8, can be used effectively to provide the necessary switching. A single momentary TALK push-button switch PB3 controls the analog switches 127, SU1 through SU8, to switch between the TALK and LISTEN modes without any moving parts. This method increases the power output, reduces the parts count, simplifies the switching requirements, and provides for low amplifier drive currents. The high efficiency of the piezo transducers used for inside speaker SP1 and outside speaker SP2, offers maximum sound for minimum input power.

The invention has been described in detail, with particular emphasis on its preferred embodiment. Variations and modifications within the spirit and scope of the invention will occur to those skilled in the art to which the invention pertains.

I claim:

1. An electronic intercommunication system for transmitting signal through a door or other partition comprising:
   first piezo transducer means mountable on one side of the door/partition and a second piezo transducer member mountable on one side of the of the door/partition, each single piezo transducer member mountable on the other side a microphone or a speaker;
   a matrix of electronic analog switching means operatively connected to said first and second single piezo transducer members;
   bridge amplifier means having input means and output means;
   said electronic analog switching means operatively connecting said first single piezo transducer member to the input means of said bridge amplifier means and said second single piezo transducer member to the output means of said bridge amplifier means, the bridge amplifier means enabling said second Single piezo transducer member to be driven by a peak-to-peak voltage greater than the system voltage while only impressing the system voltage through the electronic analog switching means; and
   TALK switching means operatively connected to said electronic analog switching means for reversing the connection of said electronic analog switching means to said first and said second single piezo transducer members;
   wherein actuation of the TALK switching means changes the condition of said electronic analog switching means to operatively reverse the connection of said first and said second single piezo transducer members to the bridge amplifier means.

2. The invention according to claim 1 and further including power switching means for connecting a system voltage to the electronic circuitry of said system, and shut-off timer means operatively connected to said power switch means and to the system voltage for turning off the power switching means upon termination of a pre-determined time period.

3. The invention according to claim 2 and further including doorbell switch means for resetting said shut-off timer means.

4. The invention according to claim 3 and further including oscillator means connected to said doorbell means for generating an audible signal to said bridge amplifier means to send an alert signal that said doorbell means has been actuated.

5. An electronic intercommunication system for transmitting signals through a door or other partition comprising:
   first audio transducer means mountable on one side of the door/partition and a second audio transducer means mountable on the other side of the door/partition, each of said audio transducer means serving alternatively as either a microphone or a speaker;
   electronic switching means operatively connected to said first and second audio transducer means;
   amplifier means having input means and output means;
   said electronic switching means operatively connecting said first audio transducer means to the input means of said amplifier means and said second audio transducer means to the output means of said amplifier means, the amplifier means enabling audio transducer means to be driven by a peak-to-peak voltage greater than the system voltage while only impressing the system voltage through the electronic switching means; and
   TALK switching means operatively connected to said electronic switching means for reversing the connection of said electronic switching means to said first and said second audio transducer means;
   wherein actuation of the TALK switching means changes the condition of said electronic switching means to operatively reverse the connection of said first and said second audio transducer means to the amplifier means.

6. The invention according to claim 5 and further including power switching means for connecting a system voltage to the electronic circuitry of said system, and shut-off timer means operatively connected to said power switch means and to the system voltage for turning off the power switching means upon termination of a predetermined time period.

7. The invention according to claim 6 and further including doorbell switch means for resetting said shut-off timer means.

8. The invention according to claim 7 and further including oscillator means connected to said doorbell means for generating an audible signal to said amplifier means to send an alert signal that said doorbell means has been actuated.

9. The invention according to claim 5 wherein said system further includes housing means for containing said audio transducer means, and support means for supporting said housing means to the door/partition to dampen vibration produced by said audio transducer means to enable greater signal amplitude without oscillatory feedback.

10. The electronic intercommunication system according to claim 5 wherein said audio transducer means each comprise a transducer device having a nodal diameter; and sheet material for sealing said system against deleterious substances; said sheet material having holes with diameters equal to the nodal diameter of each of said audio transducer devices, said audio transducer devices each being attached to said sheet material across said hole for acting as a diaphragm for the audio transducer device attached to said sheet material, to increase the sound output and efficiency of the audio transducer device.

11. An electronic intercommunication system for transmitting signals through a door or other partition comprising:
   first audio transducer means mountable on one side of the door/partition and a second audio transducer means mountable on the other side of the door/partition, each of said audio transducer means serving alternatively as either a microphone or a speaker;
   electronic switching means operatively connected to said first and second audio transducer means;

amplifier means having input means and output means;

said electronic switching means operatively connecting said first audio transducer means to the input means of said amplifier means and said second audio transducer means to the output means of said amplifier means, said amplifier means enabling audio transducer means to be driven by a peak-to-peak voltage greater than the system voltage while only impressing the system voltage through the electronic switching means;

TALK switching means operatively connected to said switching means for reversing the connection of said electronic switching means to said first and said second audio transducer means wherein actuation of the TALK switching means changes the condition of said electronic switching means to operatively reverse the connection of said first and said second audio transducer means to the amplifier means;

power switching means for connecting a system voltage to the electronic circuitry of said system; and shut-off timer means operatively connected to said power switch means and to the system voltage for turning off the power switching means upon termination of a predetermined time period.

12. The invention according to claim 11 and further including doorbell switch means for resetting said shut-off timer means.

13. The invention according to claim 11 and further including oscillator means connected to said doorbell means for generating an audible signal to said amplifier means to send an alert signal that said doorbell means has been actuated.

* * * * *